United States Patent [19]

Dillard

[11] Patent Number: 5,552,878
[45] Date of Patent: Sep. 3, 1996

[54] ELECTRONIC VERNIER FOR LASER RANGE FINDER

[75] Inventor: Homer E. Dillard, Bridgeton, Mo.

[73] Assignee: McDonnell Douglas Corporation, St. Louis, Mo.

[21] Appl. No.: 333,774

[22] Filed: Nov. 3, 1994

[51] Int. Cl.$^6$ .............................. G01C 3/08; G04F 8/00; G01S 13/08
[52] U.S. Cl. .................... 356/5.07; 342/135; 368/120
[58] Field of Search ............................ 368/120; 356/28, 356/5.08, 5.07; 342/94, 95, 105, 135

[56] References Cited

U.S. PATENT DOCUMENTS

| | | | |
|---|---|---|---|
| 4,332,475 | 6/1982 | Demarest | 356/386 |
| 4,433,919 | 2/1984 | Hoppe | 368/120 |
| 4,439,046 | 3/1984 | Hoppe | 368/120 |
| 4,518,256 | 5/1985 | Schwartz . | |
| 4,620,788 | 11/1986 | Giger | 368/118 |
| 5,199,008 | 3/1993 | Lockhart et al. | 368/120 |
| 5,200,933 | 4/1993 | Thornton et al. | 368/113 |
| 5,291,262 | 3/1994 | Dunne | 368/120 |

*Primary Examiner*—Stephen C. Buczinski
*Attorney, Agent, or Firm*—Bell, Seltzer, Park & Gibson, P.A.

[57] ABSTRACT

An electronic vernier for a laser range finder enhances the resolution of the range finder to that of the vernier without increasing the frequency of the range clock. The range finder includes a range counter circuit for storing the total integer number of clock pulses produced by a range clock and counted by a range counter. The vernier includes a tapped delay line which subdivides the clock pulses into a predetermined plurality of equal increments. The contents of the tapped delay line at the time of transmission of the ranging pulse, and reception of the reflected ranging pulse identify the phase of the clock pulse. An electronic storage register of the vernier captures and stores the contents of the tapped delay line, and then transfers vernier transmission and reception fractions to a system controller for computing a corrected range measurement from the total integer number of clock pulses produced by the range clock and counted by the range counter. The error in the range measurement is reduced to the error range of the taped delay line without increasing the frequency of the range clock.

10 Claims, 3 Drawing Sheets

ELECTRONIC VERNIER FOR LASER RANGE FINDER

FIELD OF THE INVENTION

The present invention relates to a vernier for a range finder, and more particularly to an electronic vernier for increasing the resolution of a laser range finder.

BACKGROUND OF THE INVENTION

LADAR (laser detecting and ranging) range finders, much like their RADAR (radio detecting and ranging) counterparts, determine the distance to a target by measuring the time interval required for an energy, or ranging, pulse to be transmitted to the target and reflected back to the laser. The time interval between transmission of the ranging pulse and reception of the reflected ranging pulse is a measure of the distance, or range, to the target.

Conventional laser range finders typically use an electronic range counter circuit to measure the time interval. The range counter circuit generally includes a high frequency, digital range clock for producing clock pulses, a range counter for counting the clock pulses, and a range latch for storing the total integer number of clock pulses counted by the range counter. The resolution of the range measurement thus depends, to a great extent, on the precision of the range counter circuit and the operating frequency of the range clock.

The range counter counts the integer number of clock pulses produced by the range clock during the time interval between transmission of the ranging pulse and reception of the reflected pulse. The range counter begins counting at the first clock pulse after the ranging pulse is transmitted, and stops counting at the first clock pulse after the reflected ranging pulse is received. The total integer number of clock pulses counted during the time interval is a function of the measured range to the target. The true range, however, is almost always different from the measured range. The error between the measured range and the true range depends on the synchronization of the clock pulses with the transmission and reception of the ranging pulse.

FIG. 1 illustrates two examples of a typical error between the measured range and the true range. The square waveform shown at the top of FIG. 1 represents the digital clock pulses produced by the range clock. The waveform transitions to a positive level each time the range clock pulses. The examples labeled "A" and "B" in the middle and at the bottom of FIG. 1, repectively, each represent a ranging pulse transmitted by the laser, reflected by the target, and received back at the laser.

In example "A", an electronic start pulse simultaneously signals the laser to transmit the ranging pulse and the range counter circuit to begin counting range clock pulses. The ranging pulse is transmitted (in response to the start pulse) just before the clock pulse labeled "C1" near the top of FIG. 1. Thus, the first clock pulse counted by the range counter is counted at the positive transition of the first clock pulse after the start pulse is received and the ranging pulse is transmitted as indicated by "C1".

The ranging pulse is reflected by the target and received back at the laser. An electronic stop pulse is transmitted to the range counter circuit when the reflected ranging pulse is received back at the laser. In example "A", the reflected ranging pulse is received back at the laser just after the third clock pulse (indicated by "C3") is counted. The stop pulse signals the range counter circuit to stop counting clock pulses. Thus, the last clock pulse counted by the range counter is counted at the positive transition of the first clock pulse after the reflected ranging pulse is received and the stop pulse is transmitted as indicated by "C4".

The measured range in example "A" is therefore equal to 4 clock pulses. The true range, however, is only equal to approximately 2 and ¼ clock pulses. The error between the measured range and the true range is thus about 1 and ¾ clock pulses.

In example "B" at the bottom of FIG. 1, another ranging pulse is transmitted by the laser, reflected by the target, and received back at the laser. The ranging pulse in example "B" is transmitted (in response to the start pulse) just after the clock pulse labeled "C1" near the top of FIG. 1, and before the clock pulse labeled "C2". Thus, the first clock pulse counted by the range counter is counted at the positive transition of the first Clock pulse after the start pulse is received and the ranging pulse is transmitted as indicated by "C2".

As in example "A", the ranging pulse is reflected by the target and received back at the laser. An electronic stop pulse is again transmitted to the range counter circuit when the reflected ranging pulse is received back at the laser. In example "B", the reflected ranging pulse is received back at the laser just before the fourth clock pulse (indicated by "C4") is counted. The stop pulse signals the range counter circuit to stop counting clock pulses. Thus, the last clock pulse counted by the range counter is counted at the positive transition of the first clock pulse after the reflected ranging pulse is received and the stop pulse is transmitted as indicated by "C4".

The measured range in example "B" is therefore equal to 3 clock pulses. The true range, however, is only equal to approximately 2 and ¾ clock pulses. The error between the measured range and the true range is thus about ¼ clock pulses.

As FIG. 1 illustrates, the total error between the measured range and the true range can vary in magnitude between 0 and 2 clock pulses. If the time between transmission of the ranging pulse and the next clock pulse is small, as illustrated in example "A", the measured range is greater than the true range by an amount approaching 1 clock pulse. The error approaches 1 clock pulse as transmission of the ranging pulse and the positive transition of the next clock pulse approach coincidence.

If the time between transmission of the ranging pulse and the next clock pulse is large (up to one period of the clock pulse) as illustrated in example "B", the measured range is greater than the true range by an amount approaching 0 clock pulses. The error approaches 0 clock pulses as transmission of B the ranging pulse and the positive transition of the previous clock pulse approach coincidence.

The measured range is also greater than the true range by an amount approaching 1 clock pulse if the time between reception of the ranging pulse and the next clock pulse is large (up to one period of the clock pulse), as illustrated in example "A". The error approaches 1 clock pulse as reception of the ranging pulse and the positive transition of the previous clock pulse approach coincidence.

Similarly, the measured range is also greater than the true range by an amount approaching 0 clock pulses if the time between reception of the ranging pulse and the next clock pulse is small, as illustrated in example "B". The error approaches 0 clock pulses as reception of the ranging pulse and the positive transition of the next clock pulse approach coincidence. The total error between the measured range and the true range thus can vary in magnitude between 0 and 2 clock pulses.

The asynchronous nature of transmission and reception of the ranging pulse relative to the clock pulses results in "synchronization jitter" in the range measurement. Transmission synchronization error results in a measured range value greater than the true range value which can vary in magnitude between 0 and 1 clock pulse, or Least Significant Bit (LSB), of the range counter. Reception synchronization error results in a measured range value greater than the true range value which also can vary in magnitude between 0 and 1 LSB. Example "A" of FIG. 1 illustrates the case in which both synchronization errors approach 1 LSB, and the total error approaches 2 LSBs. Example "B" of FIG. 1 illustrates the case in which both synchronization errors approach 0 LSBs, and the total error approaches 0 LSBs.

A typical frequency of a digital range clock for a conventional laser range finder is about 60 megahertz (MHz). Because the maximum pulse repetition rate in a typical 60 MHz range counter circuit is on the order of 30–40 MHz, the resolution of a laser range finder having a 60 MHz range clock is limited to approximately 2.5 meters per clock pulse. A total error of between 0 and 2 LSBs of the range counter circuit therefore corresponds to a random error of between 0 and 5 meters in the range measurement.

The obvious solution to enhance the resolution of a range finder is to increase the frequency of the range clock. A 60 MHz frequency for the range clock, however, is standard in the industry and is compatible with most of the electronic circuits which may be used in conjunction with a conventional range finder.

More importantly, there is a practical limit to the frequency of the range clock. Manufacturing technology limits the physical size of the etch of an integrated circuit to about 0.5 microns. In addition, because the specific impedance of the capacitance is inversely proportional to the frequency, as the frequency increases, the impedance of the circuit decreases. Therefore, the circuit is more suceptible to high frequency electromagnetically radiated energy. Accordingly, it is not practical to increase the operating frequency without excessive shielding or high frequency methodolgy becuause of the disadvantages associated with a higher frequency range counter circuit and range clock.

It is therefore an object of the invention to provide a range finder which enhances the resolution of the range measurement without increasing the frequency of the range counter circuit and the range clock.

It is a more particular object of the invention to provide an electronic vernier for a range finder which reduces the error between the measured B range and the true range to a target without increasing the frequency of the range counter circuit and the range clock.

It is another object of the invention to provide a range finder which includes a range clock having an operating frequency of 60 MHz.

It is another object of the invention to provide a range finder which includes a range counter circuit and a range clock which do not operate at a frequency which will cause electromagnetic coupling due to capacitive effects and thus make adjacent electronic circuits more suceptible to radiated high frequency noise.

SUMMARY OF THE INVENTION

The above and other objects and advantages of the invention are achieved in the embodiments described by the provision of a range finder which includes an electronic vernier for enhancing the resolution of the range measurement without increasing the operating frequency of the range clock. The range finder of the invention determines the range to a target by measuring the time interval required for a ranging pulse to be transmitted to the target and reflected back to the range finder. The time interval between transmission of the ranging pulse and reception of the reflected ranging pulse is a measure of the range to the target.

The range finder includes means for producing the ranging pulse, means for transmitting the ranging pulse, and means for receiving the reflected ranging pulse. Preferably, the ranging pulse is a pulse of electromagnetic energy produced by a laser, such as a YAG laser. However, any device which is capable of transmitting an energy pulse which can be reflected and received may be used. A transmitter transmits the ranging pulse in the direction of a predetermined target. The ranging pulse is reflected by the target, and a receiver receives the ranging pulse back at the laser.

The range finder also includes means for measuring the time interval between transmission of the ranging pulse to the target, and reception of the reflected ranging pulse. Preferably, an electronic range counter circuit is used to measure the time interval. The range counter circuit can, for example, include a high frequency, digital range clock, a range counter and a range latch.

The high frequency range clock produces clock pulses at a predetermined frequency during the time interval between transmission of the ranging pulse to the target, and reception of the reflected ranging pulse. The frequency of the range clock can be any practical frequency, however a frequency of about 60 MHz is preferred so that the range counter circuit is compatible with common electronic circuits which may used with the range finder.

The range counter counts the clock pulses produced by the range clock during the time interval between transmission and reception of the ranging pulse. The range counter begins counting at the positive transition of the first clock pulse after the ranging pulse is transmitted, and stops counting at the positive transition of the first clock pulse after the reflected ranging pulse is received. The total integer number of clock pulses produced by the range clock, and counted by the range counter, is stored by the range latch and later provided to a system controller for subsequent processing.

The total integer number of clock pulses counted during the time interval is a function of the measured range to the target. The true range, however, is less than the measured range. The error between the measured range and the true range depends on the synchronization of the clock pulses with the transmission and reception of the ranging pulse. To reduce the error between the measured range and the true range, and enhance the resolution of the range finder, the range finder includes an electronic vernier.

The vernier includes a tapped delay line, and an electronic storage register. The tapped delay line subdivides each clock pulse produced by the range clock into a predetermined plurality of equal increments. Each increment is assigned a binary number which has the same number of binary digits as the predetermined plurality of equal increments. Each of the plurality of equal increments is therefore identified by a distinct binary number which corresponds to a different phase of the clock pulse during a cycle of the range clock.

The tapped delay line is driven by the range clock to sequence the binary numbers assigned to the plurality of equal increments of the vernier during each cycle of the range clock. When the ranging pulse is transmitted by the transmitter, the contents of the delay line are captured and stored by the electronic storage register. A vernier LSB fraction corresponding to the phase of the clock pulse at the time of transmission of the ranging pulse is immediately provided to the controller for subsequent processing. When the reflected ranging pulse is received by the receiver, the contents of the delay line are again captured and stored by the electronic storage register. A vernier LSB fraction corresponding to the phase of the clock pulse at the time of reception of the ranging pulse is immediately provided to the controller for subsequent processing.

After the last clock pulse during the time interval has been counted by the range counter, the integer number of clock pulses counted by the counter and stored by the range latch is likewise provided to the controller. The controller computes a corrected range measurement which is equal to the difference between the integer data from the range latch, and the sum of the LSB fraction data from the vernier. The corrected range measurement is then converted to a standard measure of distance, such as meters, and provided to a peripheral device for storage or display.

The vernier of the invention enhances the resolution of the range finder to that of the tapped delay line. Accordingly, the error range of the range finder is reduced to the error range of the vernier. Specifically, the magnitude of the error in the range measurement of a range finder including the vernier of the invention can vary between 0 and 2 times the increment of the vernier. For example, if eight equal increments are selected for the tapped delay line, the increment of the vernier is ⅛ of a clock pulse. The total error of the range finder is thus equal to ¼ LSB, or ¼ of a clock pulse. The resolution of the range finder is increased to that of the tapped delay line provided that the time required for sequencing the tapped delay line and for capturing and storing the contents of the tapped delay line in the electronic storage register is small compared to the increment of the vernier delay line.

BRIEF DESCRIPTION OF THE DRAWINGS

Some of the objects and advantages of the invention having been stated, others will appear as the description proceeds when considered in conjunction with the accompanying drawings in which like numerals denote the same items in the different views, and in which.

DETAILED DESCRIPTION OF THE PREFERRED EMBODIMENTS

Figure 2:
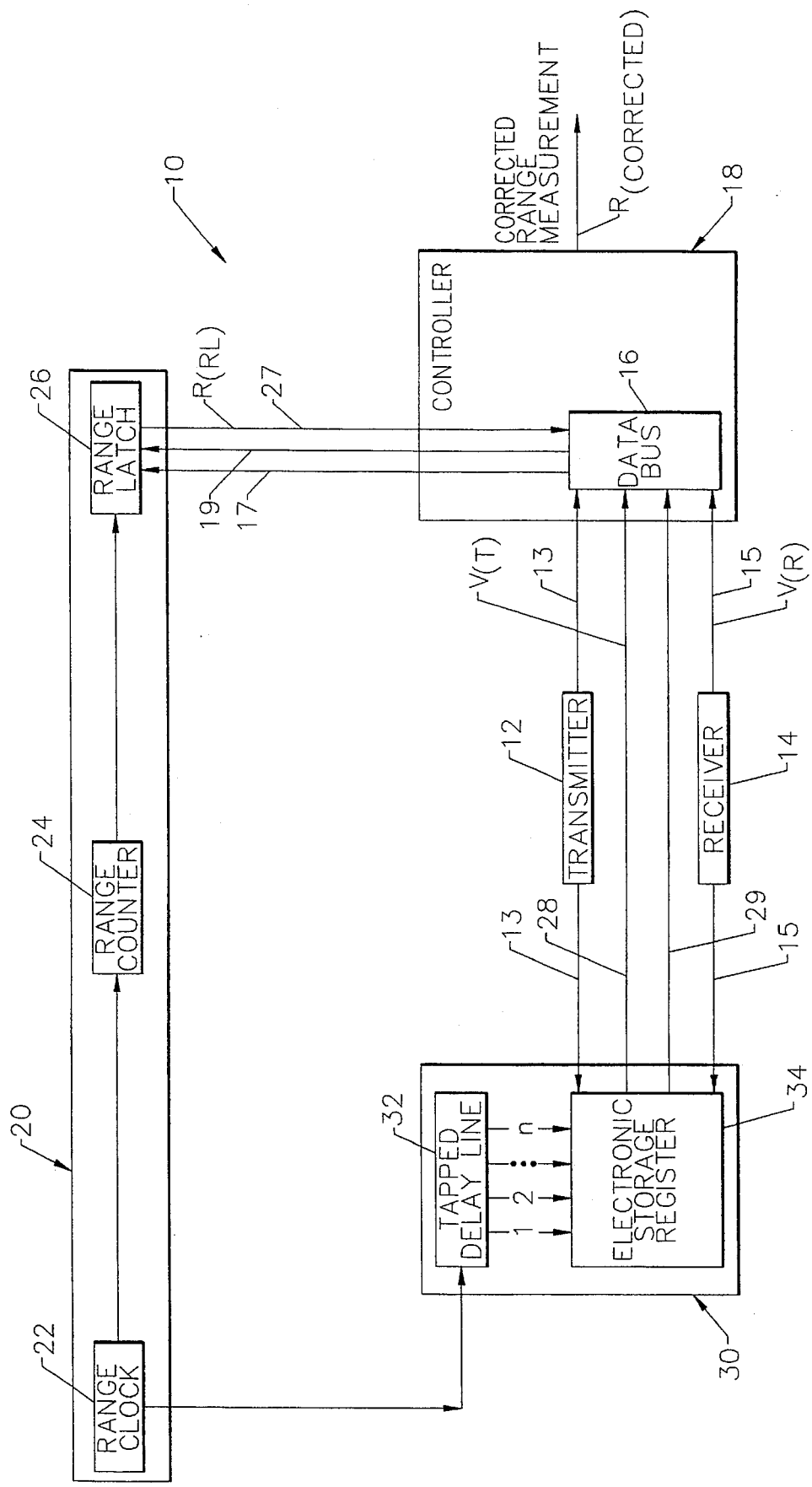
FIG. 2 is a block diagram of a range finder having an electronic vernier according to the invention.

Referring more particularly to the drawings, the block diagram of FIG. 2 illustrates one embodiment of a range finder, indicated generally at 10, having an electronic vernier 30 according to the invention. The range finder 10 may be of any type, such as LADAR, RADAR or even SONAR, which determines the range to a target by transmitting electromagnetic or acoustic energy in the direction of the target, and measuring the time interval between transmission of the energy and reception of the energy reflected by the target back at the range finder. In the illustrated embodiment, the range finder 10 is a laser range finder which transmits an electromagnetic energy, or ranging, pulse.

The range finder 10 comprises a transmitter 12, a receiver 14, a system controller 18, a range counter circuit 20, and the vernier 30. The controller 18 comprises a data bus 16 for collecting electronic signals sent to the controller, and for distributing electronic signals from the controller. The range counter circuit 20 comprises a range clock 22 for producing clock pulses, a range counter 24 for counting the clock pulses produced by the range clock, and a range latch 26 for storing the total integer number of clock pulses counted by the range counter. The vernier 30 comprises a tapped delay line 32 for subdividing the clock pulses into smaller increments, and an electronic storage register 34 for capturing and storing data from the tapped delay line which corresponds to the time of transmission and reception of the ranging pulse.

Transmitter 12 transmits the ranging pulse in the direction of a predetermined target (not shown). In the illustrated embodiment, the transmitter 12 is a laser (not shown), such as a YAG laser, for transmitting the electromagnetic energy ranging pulse. At the time of transmission of the ranging pulse, transmitter 12 sends a transmission signal 13 to the data bus 16 of controller 18, and to the electronic storage register 34 of vernier 30. The transmission signal 13 alerts data bus 16 that the next data stream transferred to the controller 18 from vernier 30 will be vernier fraction data which corresponds to transmission of the ranging pulse. The transmission signal 13 alerts the electronic storage register 34 to transfer the vernier fraction data which corresponds to transmission of the ranging pulse from the vernier 30 to the controller 18, for a purpose to be described hereafter.

Receiver 14 receives the ranging pulse reflected by the target back at the laser. In the illustrated embodiment, the receiver 14 is an Avalanche Photodiode (APD) for receiving the electromagnetic energy ranging pulse reflected by the target. The receiver, however, may be an electromagnetically tuned circuit or a piezoelectric device for a RADAR detector or a SONAR detector, respectively. At the time of reception of the ranging pulse, receiver 14 sends a reception signal 15 to the data bus 16 of controller 18, and to the electronic storage register 34 of vernier 30. The reception signal 15 alerts data bus 16 that the next data stream transferred to the controller 18 from vernier 30 will be vernier fraction data which corresponds to reception of the ranging pulse. The reception signal 15 alerts the electronic storage register 34 to transfer the vernier fraction data which corresponds to reception of the ranging pulse from the vernier 30 to the controller 18, for a purpose to be described hereafter.

The range counter circuit 20 measures the time interval between transmission of the ranging pulse, and reception of the reflected ranging pulse from the target. Range clock 22 of range counter circuit 20 is a high frequency, crystal-controlled digital clock for continuously producing a stream of digital clock pulses having a square waveform. Range clock 22 may operate at any predetermined frequency, but preferably operates at a frequency of 60 MHz so that it is compatible with existing electronic circuits which may be associated with range finder 10. A practical limit to the operating frequency of range clock 22, however, is about 100 MHz. Beyond about 100 MHz, manufacturing technology limits the physical size of the conductor spacing of the integrated circuit. Further, the high frequency of the distributed electromagnetic energy radiated by the range counter circuit 20 and the range clock 22 causes capacitance coupling with adjacent electronic circuits.

The range counter 24 of range counter circuit 20 counts the integer number of clock pulses produced by the range clock 22 during the time interval between transmission of the ranging pulse by transmitter 12, and reception of the reflected ranging pulse by receiver 14. The first clock pulse counted by range counter 24 during the time interval is counted at the positive transition of the next clock pulse produced by range clock 22 after the ranging pulse is transmitted by transmitter 12. The last clock pulse counted by the range counter 24 during the time interval is counted at the positive transition of the next clock pulse produced by the range clock 22 after the ranging pulse is received by receiver 14.

When the transmission signal 13 is collected by data bus 16 of controller 18, the data bus distributes a start signal 17 from the controller to the range latch 26. The start signal 17 instructs the range latch to begin storing the total integer number of clock pulses counted by range counter 24. As each clock pulse after transmission of the ranging pulse by transmitter 12 is counted, the total integer number of clock pulses stored by range latch 26 increases by one. When the reception signal 15 is collected by data bus 16 of controller 18, the data bus distributes a stop signal 19 from the controller to the range latch 26. The stop signal 19 instructs the range latch to stop storing the total integer number of clock pulses counted by range counter 24.

After the last clock pulse counted by range counter 24 (the next clock pulse after reception of the ranging pulse) is stored by range latch 26, a range latch data transfer signal 27 is sent to data bus 16 of controller 18. Transfer signal 27 immediately transfers the total integer number $R_{(RL)}$ of clock pulses counted by the range counter 24 during the time interval between transmission and reception of the ranging pulse. The total integer number $R_{(RL)}$ is provided to the controller 18 for subsequent processing of the corrected range measurement.

Because transmission of the ranging pulse occurs randomly under the control of an external source, while the range clock 22 produces clock pulses at regular intervals according to a predetermined frequency, transmission of the ranging pulse is rarely synchronized with the positive transition of a clock pulse. Likewise, because reception of the reflected ranging pulse depends on the range to the target (which is a random distance unrelated to the predetermined frequency of the clock pulses), reception of the ranging pulse is also rarely synchronized with the positive transition of a clock pulse. Accordingly, the transmission and reception synchronization errors each result in a measured range value greater than the true range value which can vary in magnitude between 0 and 1 clock pulse, or LSB.

The total range measurement error of the range finder 10 thus can vary in magnitude between 0 and 2 LSBs of the range counter circuit 20. The range clock 22 of range counter circuit 20 has a pulse repetition rate of about 30–40 MHz. The resolution of a typical range finder is approximately 2.5 meters per clock pulse. A total error of between 0 and 2 LSBs of the range counter circuit 20 thus corresponds to a random error of between 0 and 5 meters in the range measurement of the range finder 10.

Figure 1A:
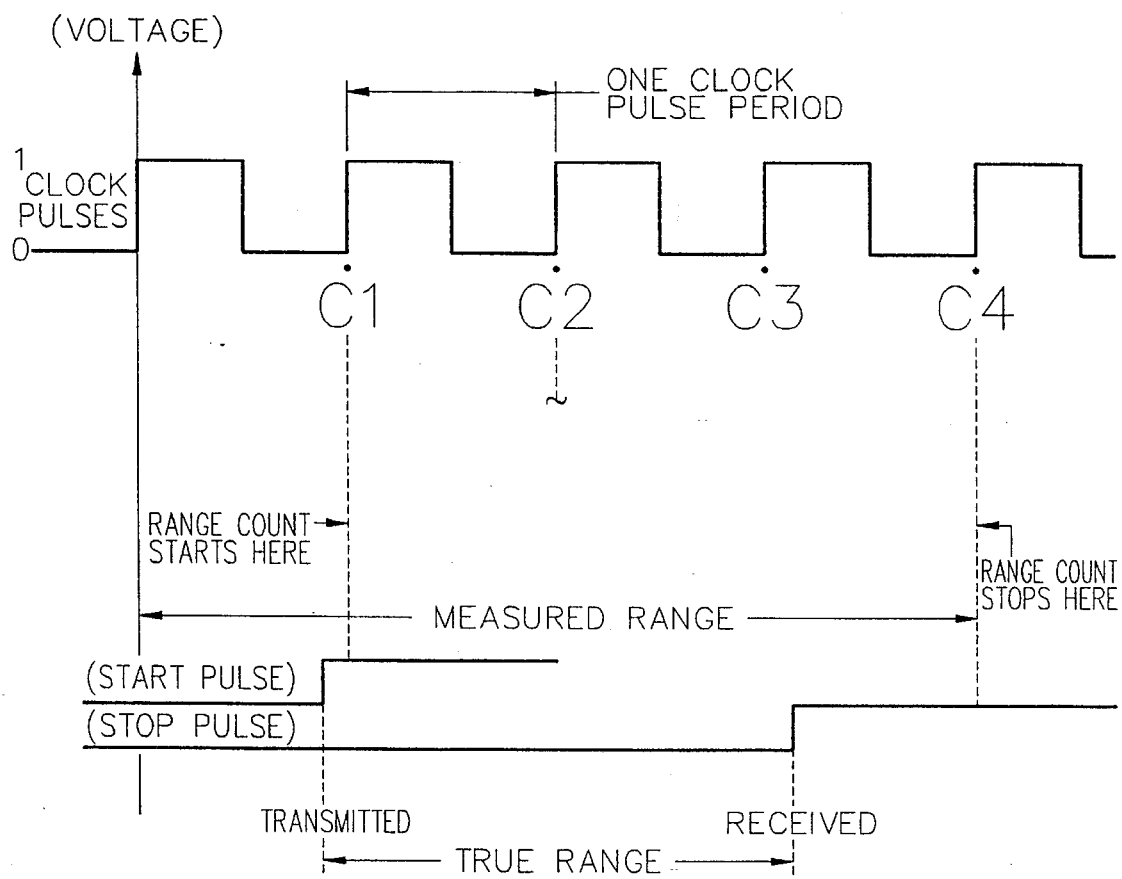
FIG. 1 is a schematic diagram illustrating the total error between the measured range and the true range of a conventional range finder.
Figure 1B:
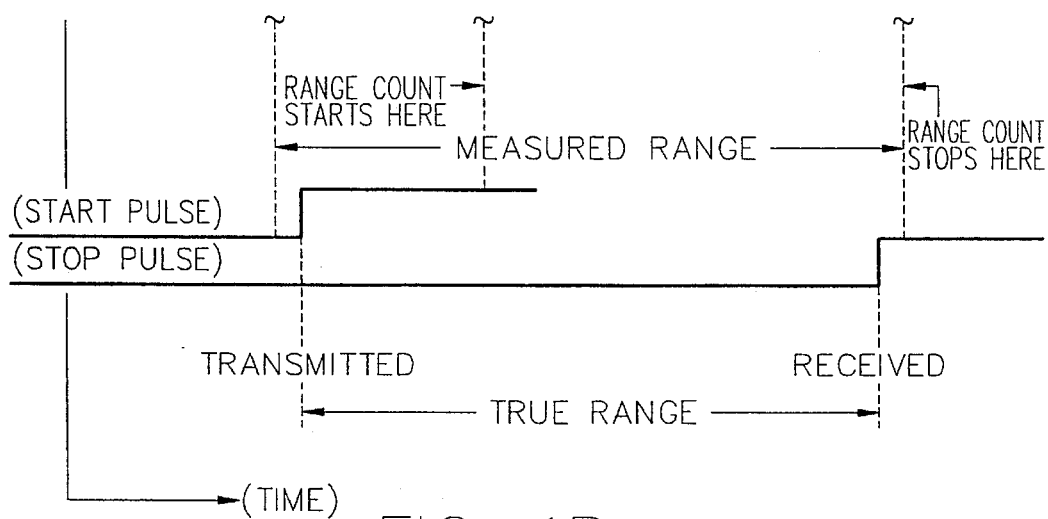

The vernier 30 enhances the resolution of the range finder 10 to that of the tapped delay line 32. The tapped delay line 32 receives the clock pulses from range clock 22 and subdivides each clock pulse into a predetermined plurality of equal increments n such that each increment is equivalent to 1/n of a clock pulse period. The tapped delay line 32 comprises a predetermined plurality of n taps for identifying the phase of the clock pulse period at any given time. As each clock pulse passes through the tapped delay line 32, each of the n taps is assigned a value of either "0" or "1" depending on the phase of the square waveform of the clock pulse (as shown in FIG. 1) at that tap position. The tap is assigned a value of "0" if the voltage of the clock pulse at the tap position is zero, or a value of "1" if the voltage is greater than zero.

The series of n taps of the tapped delay line 32 forms a binary number N which has the same number of digits as the predetermined plurality of increments n. The n taps form n different binary numbers N, or states of the tapped delay line 32, wherein each binary number N uniquely identifies a different phase of the clock pulse period. The fraction of the clock pulse, or LSB, of the range counter circuit 20 corresponding to the phase of the clock pulse period identified by the binary number N is then transferred to the controller 18 for subsequent processing of the corrected range measurement.

EXAMPLE

The following chart illustrates an example of the states of the tapped delay line 32 during one cycle of the range clock 22. If n equals 8, each clock pulse is divided into eight equal increments wherein each increment is equivalent to one eighth of the period of the clock pulse. As shown below, the taped delay line 32 comprises eight taps and there are thus eight states, or binary numbers N, which identify the phase of the clock pulse at any time.

| | States Of The Tapped Delay Line 32 During One Cycle Of The Range Clock | | | | | | | | Vernier Fraction Data | |
|---|---|---|---|---|---|---|---|---|---|---|
| Tap | 1 2 3 4 5 6 7 8 | | | | | | | | | |
| State | $t_o$ | | | | | | | | Transmission | Reception |
| 1 | 1 ↑ 0 | 0 | 0 | 0 | 1 | 1 | 1 | 1 \| 0 0 | 1 LSB | 1 LSB |
| 2 | 1 \| 1 ↑ 0 | 0 | 0 | 0 | 1 | 1 | 1 \| 1 0 | ⅛" | ⅞" |
| 3 | 1 \| 1 | 1 ↑ 0 | 0 | 0 | 1 | 1 \| 1 1 | ²⁄₈" | ⁶⁄₈" |
| 4 | 1 \| 1 | 1 | 1 ↑ 0 | 0 | 0 | 1 \| 1 1 | ³⁄₈" | ⅝" |
| 5 | 0 \| 1 | 1 | 1 | 1 ↑ 0 | 0 | 0 \| 1 1 | ⁴⁄₈" | ⁴⁄₈" |
| 6 | 0 \| 0 | 1 | 1 | 1 | 1 ↑ 0 | 0 \| 0 1 | ⅝" | ⅜" |
| 7 | 0 \| 0 | 0 | 1 | 1 | 1 ↑ 0 | 0 \| 0 0 | ⁶⁄₈" | ²⁄₈" |
| 8 | 0 \| 0 | 0 | 0 | 1 | 1 | 1 ↑ 0 \| 0 0 | ⅞" | ⅛" |
| | 1 \| 0 | 0 | 0 | 0 | 1 | 1 | 1 1 ↑ 0 0 | 1 LSB | 1 LSB |

The vertical line at the left edge of the first tap represents the time of transmission of the ranging pulse, or reception of the reflected ranging pulse. When the ranging pulse is transmitted or received, the contents of the tapped delay line 32 are captured and stored by the electronic storage register 34. At the time that the ranging pulse is transmitted, the contents of the tapped delay line 32 identify the phase of the clock pulse just prior to the positive transition of the first clock pulse counted by the range counter 24. Similarly, at the time that the reflected ranging pulse is received, the contents of the tapped delay line 32 identify the phase of the clock pulse just prior to the positive transition of the last clock pulse counted by the range counter 24.

The vertical arrows in the chart indicate the position of the positive transition of the first clock pulse counted after transmission, or the last clock pulse counted after reception. If the contents of the eight taps of the taped delay line 32 are 1,1,1,0,0,0,0,1 respectively at the time of transmission, the taped delay line is in state 4 and the positive transition of the next clock pulse is between tap 3 and tap 4. Accordingly, the phase of the clock pulse just prior to the first clock pulse to be counted by range counter 24 is such that the vernier transmission fraction $V_{(T)}$ is 3/8. The contents of the tapped delay line 32 are captured and stored by the electronic storage register 34, and a vernier data transfer signal 28 immediately transfers the vernier transmission fraction $V_{(T)}$ to the controller 18 for subsequent processing of the corrected range measurement.

If at the time of reception, the contents of the tapped delay line 32 are 0,0,1,1,1,1,0,0 respectively, the tapped delay line is in state 7 and the positive transition of the next clock pulse is between tap 6 and tap 7. Accordingly, the phase of the clock pulse just prior to the last clock pulse to be counted by the range counter 24 is such that the vernier reception fraction $V_{(R)}$ is 2/8. The contents of the tapped delay line 32 are captured and stored by the electronic storage register 34, and a vernier transfer signal 29 immediately transfers the vernier reception fraction $V_{(R)}$ to the controller 18 for subsequent processing.

Once the vernier transmission fraction $V_{(T)}$, the total integer number $R_{(RL)}$ of clock pulses counted by the range counter 24 during the time interval between transmission and reception of the ranging pulse, and the vernier reception fraction $V_{(R)}$ have been transferred to the controller 18, the corrected range measurement is computed. The controller 18 computes the corrected range measurement $R_{(CORRECTED)}$ according to the algorithm:

$$R_{(CORRECTED)} = R_{(RL)} - [V_{(T)} - V_{(R)}]$$

The corrected range measurement is then provided to an external peripheral device for storage or display.

In the example presented above, if the total integer number of clock pulses counted by range counter 24 was 200, the corrected range measurement is:

$$200\ LSB - [3/8\ LSB + 2/8\ LSB] = 199.375\ LSB$$

The magnitude of the error in the range measurement is thus reduced from between 0 and 2 LSB (0 to 5 meters), to between 0 and 1/4 LSB (0 to 0.625 meters). The enhanced resolution of the range finder 10 is therefore equivalent to an eight-fold increase in the frequency of the range clock, or a frequency of 480 MHz.

Figure 3:
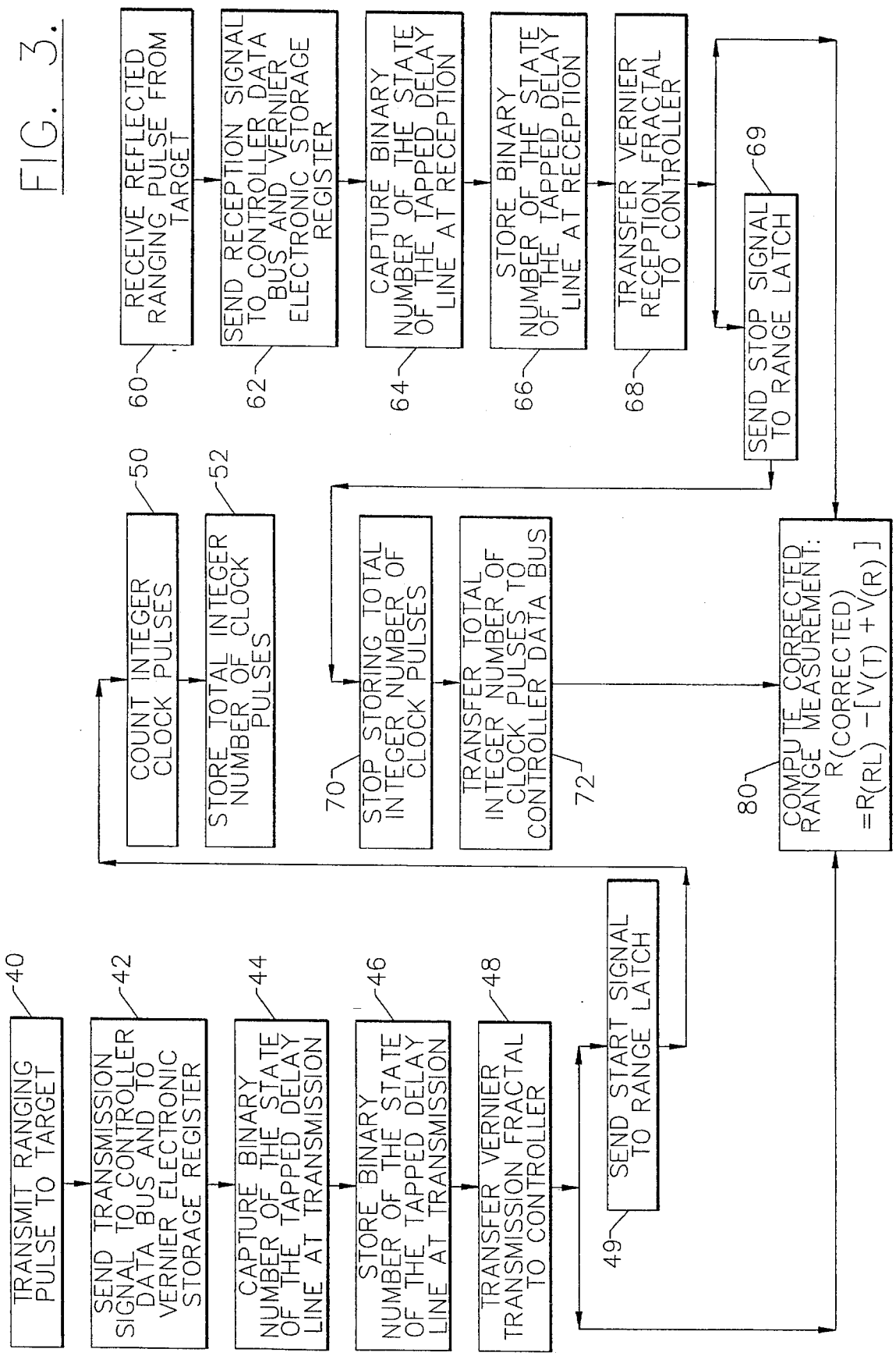
FIG. 3 is a flow chart illustrating the operations of the range finder of FIG. 2.

The flow chart of FIG. 3 illustrates the operations of the electronic vernier 30 of the range finder 10. The transmitter 12 transmits the ranging pulse in the direction of a predetermined target as illustrated by step 40. At the same time, the transmitter 12 sends a transmission signal 13 to the data bus 16 of controller 18, and to the electronic storage register 34 of vernier 30 as illustrated by step 42. Transmission signal 13 alerts controller 18 that the next data stream sent to the data bus 16 corresponds to the vernier transmission fraction $V_{(T)}$. The transmission signal 13 alerts the electronic storage register 34 that the ranging pulse has been transmitted, and to send the vernier transmission fraction to data bus 16 of controller 18.

The electronic storage register 34 captures and stores the contents of the tapped delay line 32 at the time that the ranging pulse is transmitted as illustrated by steps 44 and 46. The vernier transmission fraction $V_{(T)}$ corresponding to the binary number N which identifies the phase of the clock pulse just prior to transmission of the ranging pulse is then immediately transferred to controller 18 for subsequent processing as illustrated by step 48.

Immediately after transmission of the ranging pulse, the data bus 16 of controller 18 sends a start signal 17 to range latch 26 of range counter circuit 20 as illustrated by step 49. The start signal 17 instructs the range latch 26 to begin storing the integer number of clock pulses produced by range clock 22 and counted by range counter 24 as illustrated by step 50. Range latch 26 stores the total integer number of clock pulses counted by range counter 24, as illustrated by step 52, until the positive transition of the first clock pulse after the reflected ranging pulse is received by receiver 14 as illustrated by step 60.

When the receiver 14 receives the reflected ranging pulse from the target, the receiver sends a reception signal 15 to the data bus 16 of controller 18, and to the electronic storage register 34 of vernier 30 as illustrated by step 62. Reception signal 15 alerts controller 18 that the next data stream sent to the data bus 16 will correspond to the vernier reception fraction $V_{(R)}$. The reception signal 15 alerts the electronic storage register 34 that the reflected ranging pulse has been received, and to send the vernier reception fraction to data bus 16 of controller 18.

The electronic storage register 34 captures and stores the contents of the tapped delay line 32 at the time that the reflected ranging pulse is received as illustrated by steps 64 and 66. The vernier reception fraction $V_{(R)}$ corresponding to the binary number N which identifies the phase of the clock pulse just prior to reception of the ranging pulse is then immediately transferred to controller 18 for subsequent processing as illustrated by step 68.

Immediately after reception of the reflected ranging pulse, the data bus 16 of controller 18 sends a stop signal 19 to range latch 26 of range counter circuit 20 as illustrated by step 69. The stop signal 19 instructs the range latch 26 to stop storing the integer number of clock pulses produced by range clock 22 and counted by range counter 24 as illustrated by step 70. Range latch 26 stops storing the total integer number of clock pulses counted by the range counter 24 after the positive transition of the first clock pulse after the reflected ranging pulse is received by receiver 14.

Range latch 26 then transfers the total integer number of clock pulses counted by the range counter 24 during the time interval between transmission of the ranging pulse, and reception of the reflected ranging pulse to data bus 16 of controller 18 as illustrated by step 72. From the vernier transmission fraction $V_{(T)}$, the total integer number of clock pulses stored by the range latch $R_{(RL)}$, and the vernier reception fraction $V_{(R)}$, the controller 18 computes the corrected range measurement $R_{(CORRECTED)}$ as illustrated by step 80.

In the drawings and the specification, there has been set forth a particular embodiment of the invention, and although specific terms are employed, they are used in a generic and descriptive sense only and not for purposes of limitation.

Accordingly, there are many other embodiments of the invention which have not been described which nevertheless are intended to be included within the broad scope of the invention.

That which is claimed is:

1. A range finder for determining the range to a target comprising a transmitter for transmitting a ranging pulse in the direction of the target;

a receiver for receiving the ranging pulse reflected by the target back to said range finder;

reference clock means for producing a plurality of clock pulses at a predetermined frequency during the time interval between transmission of the ranging pulse by said transmitter and reception of the reflected ranging pulse by said receiver, wherein said reference clock means produces the plurality of clock pulses independent and free of synchronization with the ranging pulse transmitted by said transmitter;

vernier means for subdividing the clock pulses into a predetermined plurality of equal increments corresponding to respective phases of the clock pulse; and a controller operatively connected to said reference clock means and said vernier means for determining a corrected range to the target, wherein said controller comprises:

means for determining a vernier transmission fraction based upon the relative phase of the clock pulse at the time at which the ranging pulse was transmitted;

means for determining a vernier reception fraction based upon the relative phase of the clock pulse at the time at which the reflected ranging pulse was received;

means for determining a total integral number of clock pulses produced by said reference clock means between the transmission of the ranging pulse by said transmitter and the reception of the reflected ranging pulse by said receiver; and means for determining the corrected range to the target based upon the total integral number of clock pulses, the vernier transmission fraction and the vernier reception fraction.

2. The range finder according to claim 1 wherein said reference clock means is a high frequency, digital clock.

3. The range finder according to claim 2 wherein the predetermined frequency of said digital clock is 60 megahertz (MHz).

4. The range finder according to claim 1 wherein said controller comprises a microprocessor.

5. The range finder according to claim 1 wherein said vernier means comprises a tapped delay line comprising a predetermined number of taps for subdividing the clock pulses into the corresponding predetermined number of equal increments, each of the taps of said tapped delay line having a value of 0 or 1 depending on the phase of the waveform of the clock pulses such that said tapped delay line comprises a binary number which identifies the phase of the clock pulses at any time; and an electronic storage register for storing the binary number of said tapped delay line at the time that the ranging pulse is transmitted by said transmitter, and again at the time that the reflected ranging pulse is received by said receiver.

6. A laser range finder for determining the range to a target by measuring the time interval between a ranging pulse of electromagnetic energy radiated from a transmitter to the target and a reflection of the ranging pulse reflected from the target and received by a receiver, said laser range finder comprising a high frequency, digital reference clock for producing a plurality of digital clock pulses at a predetermined frequency, wherein said reference clock means produces the plurality of clock pulses independent of and free of synchronization with the ranging pulse transmitted by said transmitter;

electronic counting means operatively connected to said reference clock for counting the plurality of clock pulses produced by said reference clock during the time interval between transmission of the ranging pulse by said transmitter, and reception of the reflected ranging pulse by said receiver;

vernier means for subdividing the plurality of digital clock pulses into a predetermined plurality of equal increments corresponding to respective phases of the clock pulse; and a controller for determining a corrected measure of the range to the target, wherein said controller comprises:

means for determining a vernier transmission fraction based upon the relative phase of the clock pulse at the time at which the ranging pulse was transmitted;

means for determining a vernier reception fraction based upon the relative phase of the clock pulse at the time at which the reflected ranging pulse was received;

means for determining a total integral number of clock pulses produced by said reference clock means between the transmission of the ranging pulse by said transmitter and the reception of the reflected ranging pulse by said receiver; and means for determining the corrected range to the target based upon the total integral number of clock pulses, the vernier transmission fraction and the vernier reception fraction.

7. The laser range finder according to claim 6 wherein said vernier means comprises a tapped delay line comprising a predetermined plurality of taps for subdividing each of the plurality of clock pulses into the corresponding predetermined plurality of equal increments, each of the taps having a value of 0 or 1 depending on the phase of the waveform of the clock pulses such that said tapped delay line defines a binary number which identifies the phase of the clock pulses at any time; and an electronic storage register for capturing and storing the binary number at the time of transmission of the ranging pulse and the binary number at the time of reception of the reflected ranging pulse, said electronic storage register comprising means for transferring a vernier transmission fraction corresponding to the binary number at the time of transmission of the ranging pulse, and a vernier reception fraction corresponding to the binary number at the time of reception of the reflected ranging pulse, respectively, to said controller for determining the corrected range to the target.

8. A method of increasing the resolution of a range finder comprising a range clock for producing a plurality of clock pulses of a predetermined frequency without increasing the frequency of the range clock, the method comprising the steps of transmitting a ranging pulse in the direction of a target;

receiving the ranging pulse reflected by the target back at the range finder;

producing a plurality of clock pulses of a predetermined frequency which are independent of and free of synchronization with the ranging pulse;

subdividing each of the plurality of clock pulses into a predetermined plurality of equal increments;

assigning each of the equal increments a binary number for identifying the phase of the clock pulse at the respective increment;

providing a vernier transmission fraction to a system controller, wherein the vernier transmission fraction corresponds to the binary number identifying the phase of the clock pulse at the time of transmission of the ranging pulse;

counting the total integer number of clock pulses during the time interval between transmission of the ranging pulse and reception of the reflected ranging pulse;

providing a vernier reception fraction to the system controller which corresponds to the binary number identifying the phase of the clock pulse at the time of reception of the reflected ranging pulse;

providing the total integer number of clock pulses during the time interval between transmission of the ranging pulse and reception of the reflected ranging pulse to the system controller; and determining a corrected range to the target based upon the total integer number of clock pulses, the vernier transmission fraction and the vernier reception fraction.

9. The method of claim 8 wherein the step of providing the vernier transmission fraction to the system controller further comprises the steps of capturing the binary number identifying the phase of the clock pulses at the time of transmission of the ranging pulse in an electronic storage register;

storing the binary number identifying the phase of the clock pulses at the time of transmission of the ranging pulse in the electronic storage register; and transferring the binary number identifying the phase of the clock pulses at the time of transmission of the ranging pulse to the system controller.

10. The method of claim 8 wherein the step of providing the vernier reception fraction to the system controller further comprises the steps of capturing the binary number identifying the phase of the clock pulses at the time of reception of the reflected ranging pulse in an electronic storage register;

storing the binary number identifying the phase of the clock pulses at the time of reception of the reflected ranging pulse in the electronic storage register; and transfering the binary number identifying the phase of the clock pulses at the time of reception of the reflected ranging pulse to the system controller.

* * * * *

UNITED STATES PATENT AND TRADEMARK OFFICE
CERTIFICATE OF CORRECTION

PATENT NO. : 5,552,878

DATED : September 3, 1996

INVENTOR(S) : Homer E. Dillard

Page 1 of 2

It is certified that error appears in the above-identified patent and that said Letters Patent is hereby corrected as shown below:

Title page, item [57], next to last line, delete "taped" and insert --tapped-- therefor.

Column 2, line 7, "4" should not be bold type.

Column 2, line 18, delete "Clock" and insert --clock-- therefor.

Column 2, line 53, omit "B".

Column 3, line 42, delete "becuase" and insert --because-- therefor.

Column 3, line 51, omit "B".

Column 4, line 35, after "may" insert --be--.

Column 8, line 45, delete "taped" and insert --tapped-- therefor.

Column 9, line 13, delete "taped" and insert --tapped-- therefor.

Column 9, line 15, delete "taped" and insert --tapped-- therefor.

Column 11, line 34, delete "integral" and insert --integer-- therefor.

Column 11, line 41, delete "integral" and insert --integer-- therefor.

UNITED STATES PATENT AND TRADEMARK OFFICE
CERTIFICATE OF CORRECTION

PATENT NO. : 5,552,878
DATED : September 3, 1996
INVENTOR(S) : Homer E. Dillard

It is certified that error appears in the above-identified patent and that said Letters Patent is hereby corrected as shown below:

Column 12, line 31, delete "integral" and insert --integer-- therefor.

Column 12, line 36, delete "integral" and insert --integer-- therefor.

Signed and Sealed this

Tenth Day of June, 1997

Attest:

BRUCE LEHMAN

Attesting Officer     Commissioner of Patents and Trademarks